United States Patent
Akiyama et al.

(10) Patent No.: US 12,315,297 B2
(45) Date of Patent: May 27, 2025

(54) PERSONAL INFORMATION DISPLAY DEVICE AND PROCESSING METHOD THEREFOR

(71) Applicant: Maxell, Ltd., Kyoto (JP)

(72) Inventors: Hitoshi Akiyama, Kyoto (JP); Hiroaki Ono, Kyoto (JP)

(73) Assignee: Maxell, Ltd., Kyoto (JP)

( * ) Notice: Subject to any disclaimer, the term of this patent is extended or adjusted under 35 U.S.C. 154(b) by 406 days.

(21) Appl. No.: 17/614,413

(22) PCT Filed: May 29, 2019

(86) PCT No.: PCT/JP2019/021418
§ 371 (c)(1),
(2) Date: Nov. 26, 2021

(87) PCT Pub. No.: WO2020/240747
PCT Pub. Date: Dec. 3, 2020

(65) Prior Publication Data
US 2022/0222971 A1     Jul. 14, 2022

(51) Int. Cl.
*G06K 9/00* (2022.01)
*G06F 3/01* (2006.01)
(Continued)

(52) U.S. Cl.
CPC ............ *G06V 40/197* (2022.01); *G06F 3/013* (2013.01); *G06F 21/32* (2013.01)

(58) Field of Classification Search
CPC ....................................................... G06F 21/32
See application file for complete search history.

(56) References Cited

U.S. PATENT DOCUMENTS 10,345,902 B1 * 7/2019 Yildiz ................. G02B 27/0093
11,068,072 B2 * 7/2021 Kanda .................. G06Q 10/101
(Continued)

FOREIGN PATENT DOCUMENTS

JP     2007-6393 A     1/2007
JP     2016-506530 A     3/2016

OTHER PUBLICATIONS

International Search Report of PCT/JP2019/021418 dated Aug. 13, 2019.

*Primary Examiner* — Hadi Akhavannik
(74) *Attorney, Agent, or Firm* — Mattingly & Malur, PC

(57) ABSTRACT

A personal information display device can recognize card information or service information in advance so that passwords required for various cards or services can be immediately recognized and can display a password or an ID associated with the information after authenticating the individual. In order to achieve this, a processing method of a personal information display device having a glasses-shaped display unit includes: capturing an iris of an individual wearing the personal information display device and acquiring iris information from the captured iris; capturing information of various cards or various services and acquiring recognition information of the various cards or the various services from the captured information of the various cards or the various services; and registering personal information from the iris information and registering an ID or a password associated with the recognition information of the various cards or the various services.

12 Claims, 11 Drawing Sheets

(51) Int. Cl.
   *G06F 21/32*   (2013.01)
   *G06V 40/18*   (2022.01)

(56) References Cited

U.S. PATENT DOCUMENTS

| | | | | |
|---|---|---|---|---|
| 2012/0075168 A1* | 3/2012 | Osterhout | ............... | G06F 3/017 |
| | | | | 345/8 |
| 2012/0194418 A1* | 8/2012 | Osterhout | .......... | G02B 27/0149 |
| | | | | 345/156 |
| 2012/0194551 A1* | 8/2012 | Osterhout | ............... | G06F 3/005 |
| | | | | 345/633 |
| 2013/0044055 A1* | 2/2013 | Karmarkar | ............. | G06F 21/32 |
| | | | | 345/158 |
| 2013/0072295 A1* | 3/2013 | Alderucci | ............. | G07F 17/3237 |
| | | | | 463/29 |
| 2013/0165213 A1* | 6/2013 | Alderucci | ........... | G07F 17/3241 |
| | | | | 463/25 |
| 2013/0204993 A1* | 8/2013 | Uribe-Etxebarria Jimenez .......... | | |
| | | | | H04L 41/50 |
| | | | | 709/223 |
| 2013/0278631 A1* | 10/2013 | Border | ................ | G06F 3/04842 |
| | | | | 345/633 |
| 2014/0139439 A1 | 5/2014 | Park | | |
| 2014/0282961 A1* | 9/2014 | Dorfman | ............ | G06Q 20/3276 |
| | | | | 726/7 |
| 2014/0337634 A1* | 11/2014 | Starner | ................ | H04W 12/33 |
| | | | | 713/186 |
| 2015/0378595 A1* | 12/2015 | Jung | ................... | H04L 63/0861 |
| | | | | 715/835 |
| 2016/0180070 A1* | 6/2016 | Shi | ........................ | G06V 40/19 |
| | | | | 726/18 |
| 2016/0350523 A1* | 12/2016 | Tanno | ................... | G06F 21/629 |
| 2017/0322632 A1* | 11/2017 | Kovach | .................. | G09G 5/377 |
| 2017/0374053 A1* | 12/2017 | Yasaki | ................ | H04L 63/0815 |
| 2018/0234244 A1* | 8/2018 | Starner | ................ | H04L 63/0861 |
| 2018/0276467 A1* | 9/2018 | Kaehler | ............... | G06T 19/006 |
| 2019/0025587 A1* | 1/2019 | Osterhout | ............... | G06F 1/163 |
| 2019/0173987 A1* | 6/2019 | Sung | ........................ | G02B 7/02 |
| 2022/0222971 A1* | 7/2022 | Akiyama | ................ | G06F 3/013 |

\* cited by examiner

PERSONAL INFORMATION DISPLAY DEVICE AND PROCESSING METHOD THEREFOR

TECHNICAL FIELD

The present invention relates to a personal information display device for assisting the memory of a password due to input or change of various personal IDs or passwords and a processing method thereof.

BACKGROUND ART

In recent years, with the spread of personal device terminals such as a personal computer (PC) and a smartphone, various services, cards, and the like, there is an increasing demand for input of a user login ID or a password required for personal authentication when using those described above. However, although the number of password entries is increasing as the number of terminals or services increases, password forgetting occurs frequently due to factors such as (1) many services prohibit simple passwords, (2) reusing the same password is not recommended, and (3) password changes are required on a regular basis, which are for security reasons. On the other hand, in order to prevent forgetting to remember, for example, a password may be recorded in a memo pad or the like, but this is not preferable in terms of security.

Therefore, for example, there is a service that displays various passwords using password management software, but this service is complicated because this requires time and effort to input a master password each time and select a service to be used. In addition, if the master password is leaked, all passwords will be known. In addition, re-recording is required each time a new password is registered or a password is changed, which is required on a regular basis.

Patent Document 1 is a related art in this technical field. Patent Document 1 discloses a configuration including: a portable storage medium that stores biometric information, which is biometric information unique to an individual user, and personal information of the user; an information display means for displaying the content of the personal information stored in the storage medium only within the user's field of view; and a detection means for detecting the user's biometric information. The biometric information stored in the storage medium and the biometric information detected by the detection means are read and compared with each other to perform user authentication, and the display of the personal information by the information display means is allowed only when the user authentication is established.

CITATION LIST

Patent Document

Patent Document 1: JP 2007-6393 A

SUMMARY OF THE INVENTION

Problems to be Solved by the Invention

In Patent Document 1, a head-mounted display (hereinafter, referred to as an HMD) is assumed, authentication is performed by using personal biometric information, and personal information is displayed. However, although the personal information to be displayed is, for example, a password, personal information for various cards, services, and the like is often different, and association between the personal information to be displayed and various cards, services, and the like is not taken into consideration.

In view of the above problems, the present invention provides a personal information display device, which can recognize card information or service information in advance so that passwords required for the above-described various cards, services, and the like can be immediately recognized and can simply display a password or an ID associated with the information after authenticating the individual, and a processing method thereof.

Solutions to Problems

In order to solve the aforementioned problems, the present invention is, for example, a processing method of a personal information display device having a glasses-shaped display unit. The processing method includes: capturing an iris of an individual wearing the personal information display device and acquiring iris information from the captured iris; capturing information of various cards or various services and acquiring recognition information of the various cards or the various services from the captured information of the various cards or the various services; and registering personal information from the iris information and registering an ID or a password associated with the recognition information of the various cards or the various services.

Effects of the Invention

According to the present invention, it is possible to provide a personal information display device and a processing method thereof for realizing more preferable usability.

MODE FOR CARRYING OUT THE INVENTION

Hereinafter, embodiments of the present invention will be described with reference to the diagrams.

EMBODIMENTS

Figure 1:
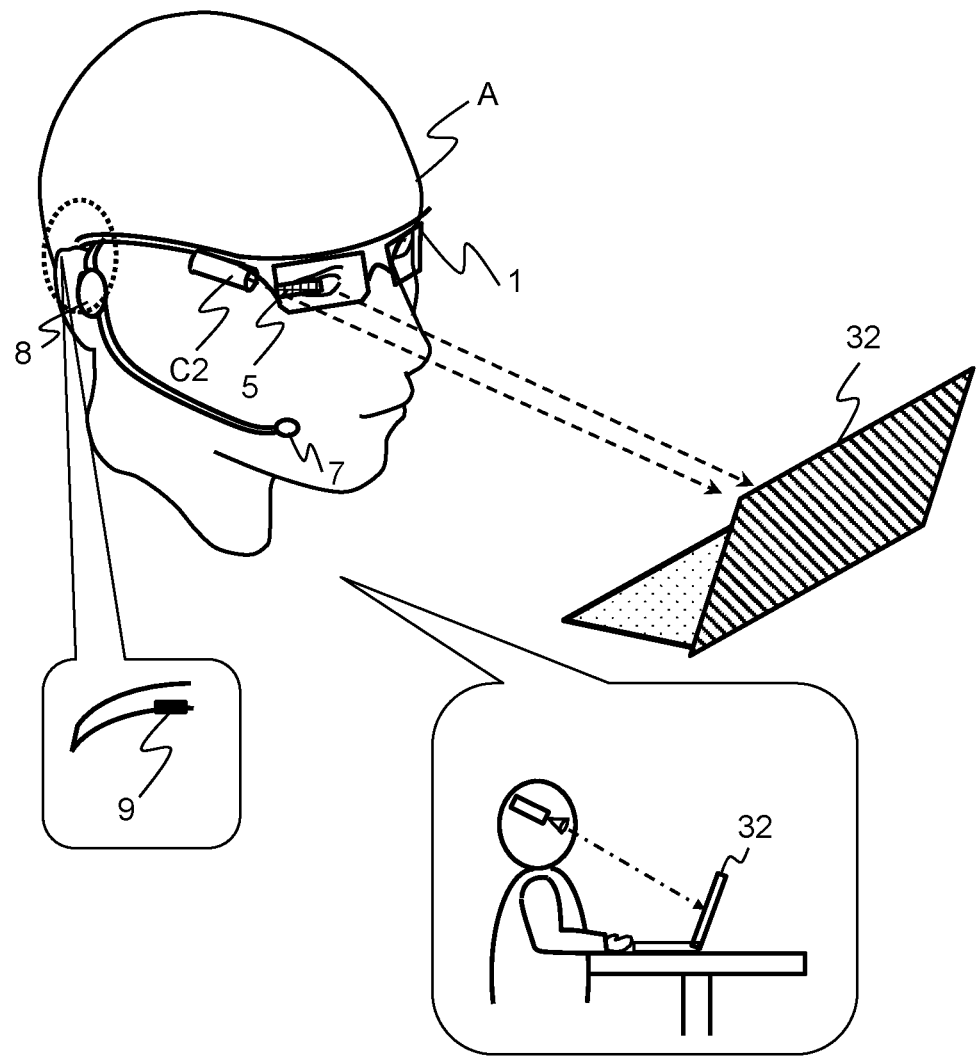
FIG. 1 is a system configuration diagram of a personal information display device in an embodiment.

FIG. 1 is a system configuration diagram of a personal information display device in the present embodiment. In FIG. 1, 1 denotes a personal information display device, which has a shape generally called an HMD. FIG. 1 shows a state in which a user A wears the personal information display device 1 and inputs an ID or a password while looking at the screen of a PC 32, for example. The personal information display device 1 includes a display unit 5 and a front capturing camera C2, and a small camera C1 for iris authentication, which is not shown, is mounted near the display unit. In addition, a wearing sensor 9 for checking that the personal information display device 1 is worn is mounted. In addition, a position sensor (6 in FIG. 2) including a GSP for identifying the place where the personal information display device 1 is worn is mounted. In addition, a microphone 7 that collects voices used by the user A as a means for transmitting information to the personal information display device 1 and an earphone 8 used by the personal information display device 1 as a means for transmitting information to the user A by sound are provided.

For example, when the user A is requested to input information of an ID and the like (hereinafter, an ID) and password information (hereinafter, a password) in order to perform various services on the PC 32, the voice of the user A or the screen shape of the PC 32 is captured by the front capturing camera C2, various services are identified by using recognition technology, whether or not it is necessary to input an ID or a password associated therewith is determined, an appropriate ID or password is displayed on the display unit 5 of the personal information display device 1, and the user A inputs the ID or the password.

Regarding the personal authentication of the user A, the iris of the user A is captured by the small camera C1 that is similarly mounted on the personal information display device 1 to capture the iris of the user A, and iris authentication is performed to determine whether or not the user A is a person concerned. In addition, the small camera C1 can also track the viewpoint of the user A, and identifies a target that the user A is looking at. Regarding this, there is a function of identifying the target by identifying the viewpoint position from the imaging range of the front capturing camera C2, which will be described later. As will be described later, the viewpoint tracking result and the viewpoint display according to this can be used as a means for asking the user A to determine whether or not various data displays associated with the personal information display device 1 are correct.

Figure 2:
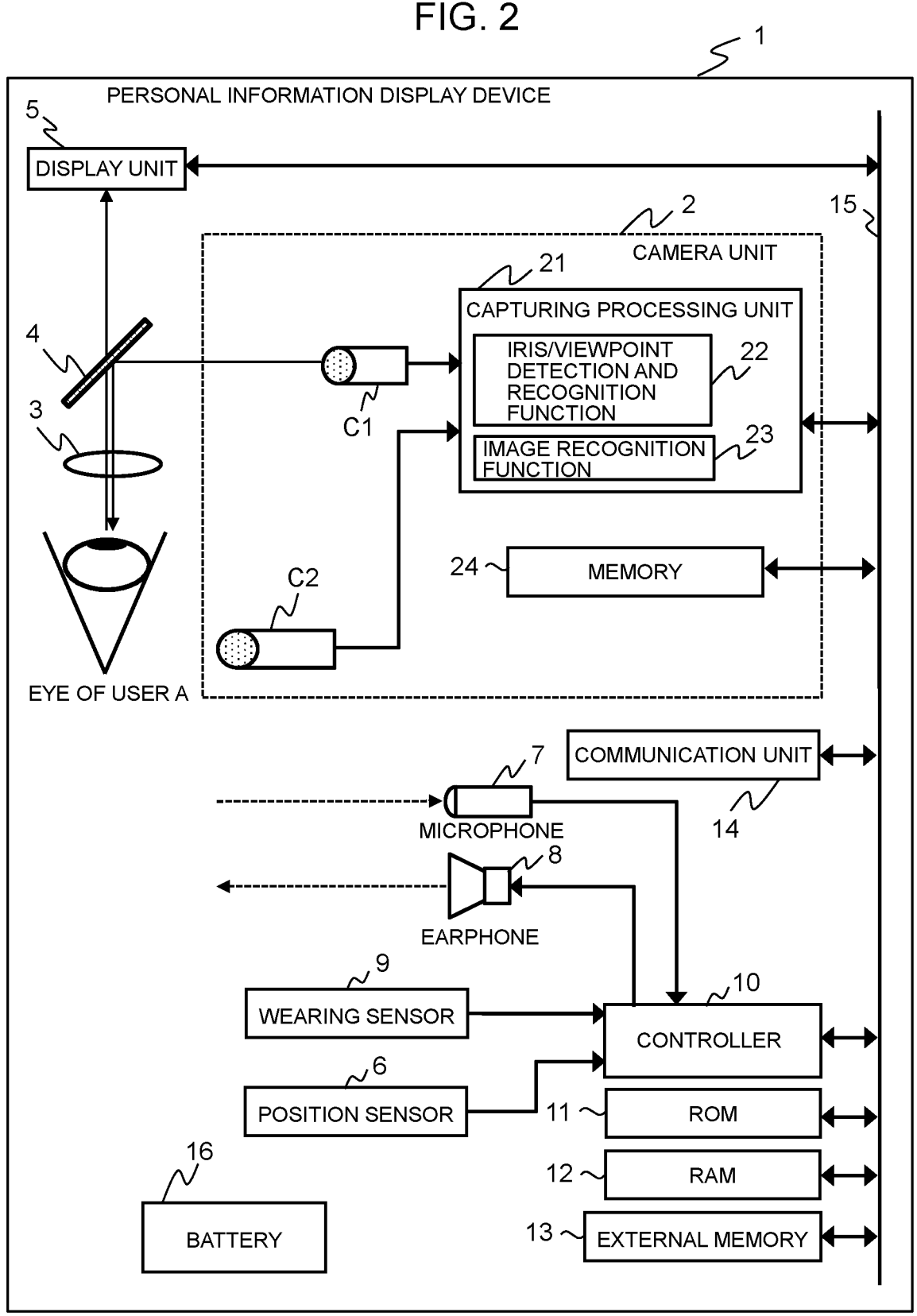
FIG. 2 is a block diagram of the configuration of the personal information display device in the embodiment.

FIG. 2 is a block diagram of the configuration of the personal information display device 1 in the present embodiment. In FIG. 2, the same functions as in FIG. 1 are denoted by the same reference numerals. In FIG. 2, the small camera C1 configured to include an ultra-small lens, a CCD or a CMOS sensor, and the like for capturing the iris or tracking the viewpoint of the user A is mounted on the personal information display device 1. In addition, a lens 3 and a half mirror 4 are an optical system for capturing the iris of the user's eye with the small camera C1 and for the user to see the image displayed on the display unit 5.

In addition, the personal information display device 1 includes a camera unit 2 including: the front capturing camera C2 configured to include a normal lens, a camera sensor, and the like; a capturing processing unit 21 configured to include an image processing unit that performs an iris/viewpoint detection and recognition function 22 for iris recognition of the user A or viewpoint detection of the user A, an image recognition function 23 for recognizing a figure, a symbol, a character, and the like and outputting these as recognition information, and the like; and a memory 24 that stores temporarily captured images or videos and is also used as a work area for performing each of the above-described processes.

The camera unit 2 includes the iris/viewpoint detection and recognition function 22 and the image recognition function for performing various image improvements and various recognition functions and the memory 24, but it is also possible to perform the same recognition function by software processing in a controller 10, which will be described later. In this case, the above functions are not required in the camera unit 2. However, since various processes are performed in parallel in the controller 10, a case is described in which the above-described various image improvements and various recognition functions are included in the camera unit 2 in consideration of speeding up the processes. Hereinafter, the case where the various image improvements or the various recognition processes are performed by the software processing in the controller 10 will be described, but the present invention is not limited thereto, and it is needless to say that some functions may be performed in the camera unit 2 and only the result may be transmitted to the controller 10.

Information is transmitted from the controller 10 to the display unit 5 configured to include an LCD that displays information such as a password. In addition, a communication unit 14 for communicating with the Internet is provided to check whether or not the personal information display device 1 is being used illegally in combination with the position sensor 6 or to update the internal software of the personal information display device 1. In addition, the controller 10 for controlling all of these and giving an instruction, a ROM (Read Only Memory) 11, a RAM (Random Access Memory) 12, an external memory 13 for storing video or image data, and a system bus 15 are provided. The wearing sensor 9 is used when the user A wears the personal information display device 1 and at the same time, starts the system, and examples thereof include a switch for detecting a simple contact and a temperature sensor for detecting a human body temperature. In addition, a small battery 16 for supplying power to these devices is provided.

In addition, the user A may be authenticated by voiceprint authentication for identifying the user A by the voice from the microphone 7. The processing in this case is performed by the software in the controller 10.

Figure 3:
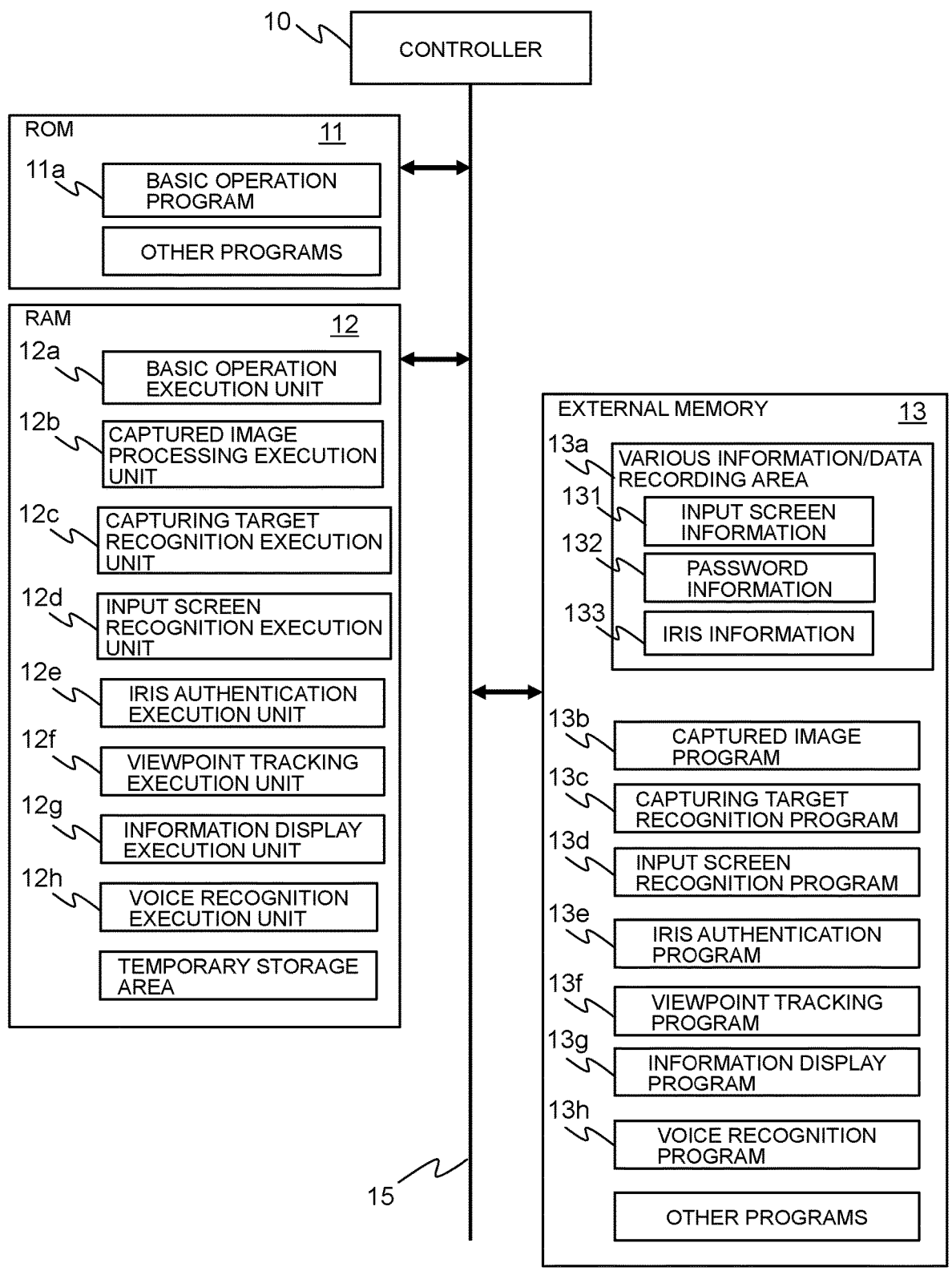
FIG. 3 is a software configuration diagram of the personal information display device in the embodiment.

FIG. 3 is a software configuration diagram of the personal information display device 1 in the present embodiment, and the same functions as in FIG. 2 are denoted by the same reference numerals.

The controller 10 is a microprocessor unit that controls the entire personal information display device 1 according to a predetermined program. The system bus 15 is a data communication path for transmitting and receiving data between the controller 10 and each unit in the personal information display device 1.

The ROM 11 is a memory in which a basic operation program, such as an operating system, or other application programs are stored. For example, a rewritable ROM, such as an EEPROM (Electrically Erasable Programmable ROM) or a flash ROM, is used. By updating the program stored in the ROM 11, it is possible to upgrade or expand the functions of the basic operation program or other application programs.

The RAM 12 serves as a work area for executing the basic operation program or other application programs. Specifically, for example, a basic operation program 11a stored in the ROM 11 is loaded to the RAM 12, and the controller 10 executes the loaded basic operation program to configure a basic operation execution unit 12a. Hereinafter, in order to simplify the description, a process in which the controller 10 loads the basic operation program 11a stored in the ROM 11 to the RAM 12 and executes the basic operation program 11a to control each unit will be described as "the basic operation execution unit 12a controls each unit". In addition, the same description shall be applied to other application programs.

A captured image processing execution unit 12b gives processing instructions for start and stop of capturing, image improvement, and the like to the capturing processing unit 21.

A capturing target recognition execution unit 12c is a program having a function of recognizing a target in which the user A captured by the front capturing camera C2 in FIG. 1 inputs an ID or a password and identifying various cards or services that the user A stored in the external memory 13 is to input. An input screen recognition execution unit 12d is a function of recognizing the ID or password input by the user A, and is encrypted and stored in the external memory 13 as digital information. At this time, the ID or the password is stored in the external memory 13 so as to be associated with various cards or services recognized by the capturing target recognition execution unit 12c. An iris authentication execution unit 12e is a program for capturing the iris of a person wearing the personal information display device 1 captured by the small camera C1 and determining whether or not the person is a registered person. A viewpoint tracking execution unit of 12f is a program that is linked with the above-described front capturing camera C2 to determine what the user A is looking at and identify the target, and can be linked with the capturing target recognition execution unit 12c to extract information more correctly. An information display execution unit 12g is a program for identifying the associated password and displays the associated password on the display unit 5. A voice recognition execution unit 12h is a program for recognizing the content of the conversation of the user A voice-input from the microphone 7 when asking a question by voice to the user A through the earphone 8.

The controller 10 has an algorithm for controlling the entire personal information display device 1.

As shown in FIG. 3, the operation of the personal information display device 1 of the present embodiment is mainly controlled by loading a captured image program 13b, a capturing target recognition program 13c, an input screen recognition program 13d, an iris authentication program 13e, a viewpoint tracking program 13f, an information display program 13g, and a voice recognition program 13h, which are stored in the external memory 13, to the RAM 12 and executing the captured image processing execution unit 12b, the capturing target recognition execution unit 12c, the input screen recognition execution unit 12d, the iris authentication execution unit 12e, the viewpoint tracking execution unit 12f, the information display execution unit 12g, and the voice recognition execution unit 12h by the controller 10. In addition, the execution units of 12b to 12h may perform some or all of the operations by respective hardware blocks for realizing some or all of the operations by hardware. At this time, for example, some of the execution units of 12b to 12f may be performed by the iris/viewpoint detection and recognition function 22 and the image recognition function 23 in the capturing processing unit 21 of the camera unit 2.

In addition, the ROM 11 and the RAM 12 may be formed integrally with the controller 10. In addition, the ROM 11 may not have an independent configuration shown in FIG. 2, and a partial storage area in the external memory 13 may be used. In addition, it is assumed that the RAM 12 has a temporary storage area for temporarily storing data as needed when executing various application programs.

The external memory 13 temporarily stores images or videos captured by the capturing processing unit 21. In addition, a various information/data recording area 13a for recording each operation setting value of a mobile information terminal 1, location information or various kinds of information of the mobile information terminal 1, and data of some of all of image or video information captured by the mobile information terminal 1, the captured image program 13b, the capturing target recognition program 13c, the iris authentication program 13e, the viewpoint tracking program 13f, the information display program 13g, the voice recognition program 13h, and other programs are stored. In particular, input screen information 131 that stores information of various cards or service information that is important in the present embodiment, password information 132 associated with the various cards or the service information that is input screen information, and iris information 133 that is the personal information of the user A are recorded in the various information/data recording area 13a. Basically, the pieces of information are encrypted and stored so that the information cannot be decrypted without the decryption key. These programs may be stored in the ROM 11 or an internal memory having non-volatile characteristics.

In addition, all or some of the functions of the ROM 11 may be replaced with a partial area of the external memory 13. In addition, the external memory 13 needs to hold the stored information even when the power is not supplied to the personal information display device 1. Therefore, for example, devices such as a flash ROM and an SSD (Solid State Drive) are used.

Next, an operation when various cards are specifically used by using the personal information display device 1 in the present embodiment will be described.

First, as a first step, user registration for using the personal information display device 1 is performed. At this time, since the personal information display device 1 has the shape of an HMD as shown in FIG. 1, the user A wears the personal information display device 1 over his or her ears like wearing glasses, for example. For ON/OFF of the power of the personal information display device 1, a physical switch that is manually operated by the user may be provided, but the wearing sensor 9 may be used instead for the sake of simplicity. In this case, since the HMD is used, the power is turned on when the ear comes into contact with a portion of the wearing sensor 9 placed in a portion where the ear touches when worn, and turned off when the ear contact is removed. Alternatively, ON is as described above, but regarding OFF, the power may be automatically turned off after a predetermined period of time has passed after detecting that the ear contact has been removed. The wearing sensor 9 may be a contact sensor that detects mere contact as described above, or may be a temperature sensor that detects body temperature. Alternatively, for the purpose of proper wearing, a physical switch type may be used, so that the switch is not turned on if secure wearing is not made. In addition, even in the case of the HMD wearing method that does not cover the ears, the wearing sensor 9 may be provided at a portion that comes into contact with the head.

Then, processing for the personal information registration of the user A is performed. At this time, it is necessary to capture and register the iris with the small camera C1. However, in order to determine whether or not wearing is correct at this time, it is determined whether or not the iris can be captured with the small camera C1. If the iris cannot be captured, for example, an alarm such as "Please wear correctly" is displayed on the display unit. Alternatively, in this state, the user A may not be able to read the content of the display unit. In this case, an alarm is sounded. This also helps prevent unauthorized use of the personal information display device 1.

When correct wearing is confirmed, iris registration is started. The iris of the user A is captured by using the small camera C1, the iris information 133 is encrypted to be recorded in the external memory 13. At this time, information such as an individual's name, age, and telephone number may be registered together with the iris registration. The registration method is performed by, for example, voice input using the microphone 7 in FIG. 2. At that time, for example, a question such as "Please say your name" is given to the user A through the earphone 8 in FIG. 2, and voice input is performed in response to the question. Alternatively, the question may be displayed on the display unit 5. For the voice input, the name recognized by voice recognition technology is once displayed on the display unit, and the personal information is input while making the user A determine whether or not the user A is correct. Alternatively, since there is also a case where it is difficult to input voice or a case where it is not desired to input voice, the personal information of the user A may be recorded while performing an input by using the input function of the keyboard or smartphone using the communication unit 14. Alternatively, by using the viewpoint tracking function and the display function described above, as will be described later, the viewpoint of the user A may be displayed on the display unit 5, a display for determining whether or not the user is correct, for example, a display of "OK?" and "NG?" may be given, and the determination may be made by bringing the viewpoint to that position. The personal information is not limited to the information such as the name, age, and telephone number, and an address, a driver's license number for identifying an individual, a passport number, an individual number, and the like may be registered. It is needless to say that the above information is encrypted and recorded in the external memory 13. In addition, since it is complicated for the user A to input the above information, a license, a passport, or a document in which an address is written may be captured by the front capturing camera C2 of the personal information display device 1, the determination may be made by using image recognition technology, and, the information may be recorded in the external memory 13.

Figure 4A:
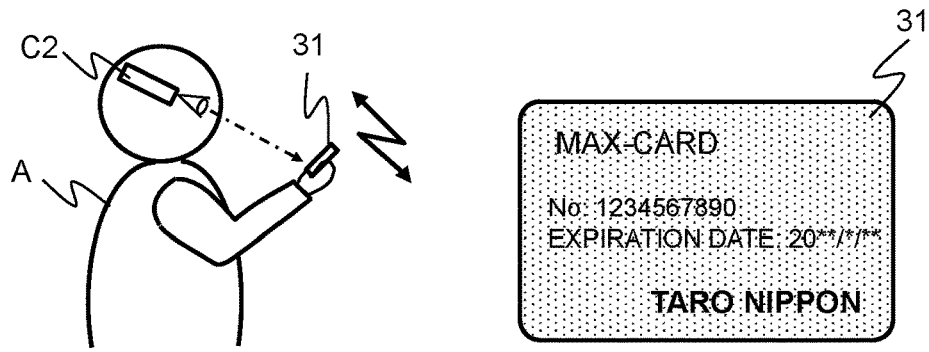
FIG. 4A is a diagram showing a user's working state when using a card by using the personal information display device in the embodiment.
Figure 4B:
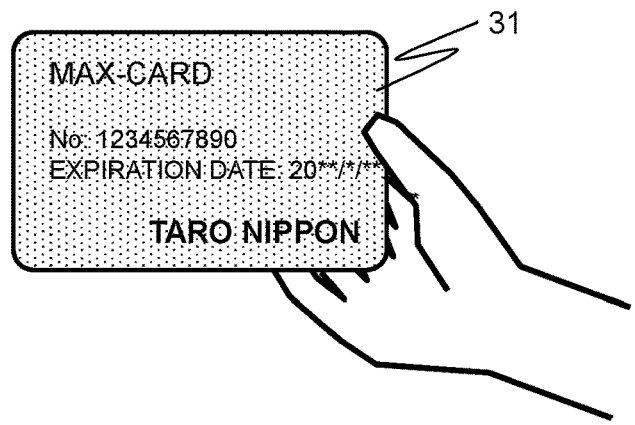
FIG. 4B is an image that a user sees when the user actually holds a card in the embodiment.

Then, card information of a target bank card or credit card is registered. At this time, as shown in FIG. 4A, the user A himself or herself moves the card so as to be able to be captured by the front capturing camera C2, and moves the card to a position where the card can be captured by the front capturing camera C2 as shown by the arrow, thereby capturing the card. At this time, FIG. 4B is an image that the user A sees when the user A actually holds the card. The captured screen of the front capturing camera C2 may be displayed on the display unit 5, and may be checked by the user A himself or herself to make an adjustment to a rough position or distance. Various kinds of information on the captured screen, for example, information such as the type of card, the card number, and the expiration date of the card is recognized by using the image recognition function 23, and the information is encrypted and then recorded in the external memory 13. With a credit card, a 3-digit or 4-digit number such as a so-called security code written on the back surface may be required at the time of use. Therefore, the information may also be registered.

In addition, in the above description, only the case of registering numbers, characters, and the like is shown, but the present invention is not limited thereto, and the credit card itself may be captured and registered as an image. This is effective for causing the user A to determine whether or not the card is registered, as will be described later. That is, the information to be recorded in the external memory may be image data on the captured screen, or may be text data such as a card type, a card number, and a card expiration date recognized from the captured image. Thereafter, when the recognition and recording are completed, the fact that the recognition and recording have been completed may be displayed on the display unit 5 for the user A. At this time, although the fact that the recording has been completed is displayed, but only "completed" or the like may be simply displayed, recorded image data on the screen may be displayed on the display unit 5, or only text data such as a card type, a card number, and card expiration date required as card information may be displayed. Alternatively, the fact that the recording has been completed may be transmitted through the earphone 8 by "completed" and voice. Alternatively, text data valid as card information may be transmitted by voice. In order to make the user A check whether or not the recognition is correct, the recognized card information is displayed on the display unit 5. Alternatively, voice may be transmitted to the user A through the earphone 8 so that the user A checks whether or not the recognition is correct. At this time, if the recognition is correct, the voice of OK may be input, the determination of OK may be made with a keyboard, or the determination may be made by using the viewpoint tracking function and the display function.

Then, passwords for various cards are registered. Since it is necessary for the user A to directly input the password, for example, input by voice is performed and the result of voice recognition is displayed on the display unit 5 in the same manner as above. After checking, the password is linked with various cards to be encrypted, and then recorded in the external memory 13. Alternatively, the password may be written on a piece of paper, captured by the front capturing camera C2, and checked by the image recognition function 23. Undoubtedly, the recognition result is transmitted to the user A to determine whether or not the recognition result is correct. Alternatively, when the user uses the credit card, for example, the order, symbols, or numbers input by the user A with a device for inputting a password are captured by the front capturing camera C2, the image is recognized, and the input numbers or symbols are stored. At that time, in order to determine whether or not the input numbers or symbols are correct, the earphone 8 may be used to make the user A check whether or not the input numbers or symbols are correct. Alternatively, the numbers or symbols input to the display unit 5 may be displayed. The user A checks whether or not the numbers or symbols are correct. For example, if the numbers or symbols are correct, a voice such as "OK" may be input to the microphone 7.

In the above encryption, an encryption key associated with the iris information may be automatically generated and encrypted. In order to increase security, a different key may be used for each card as a key for unlocking the encrypted information. Alternatively, the user A performs iris authentication when there is a request for a password, but at this time, an automatically associated encryption key may be automatically generated again and the encryption may be performed with the new key.

Figure 4C:
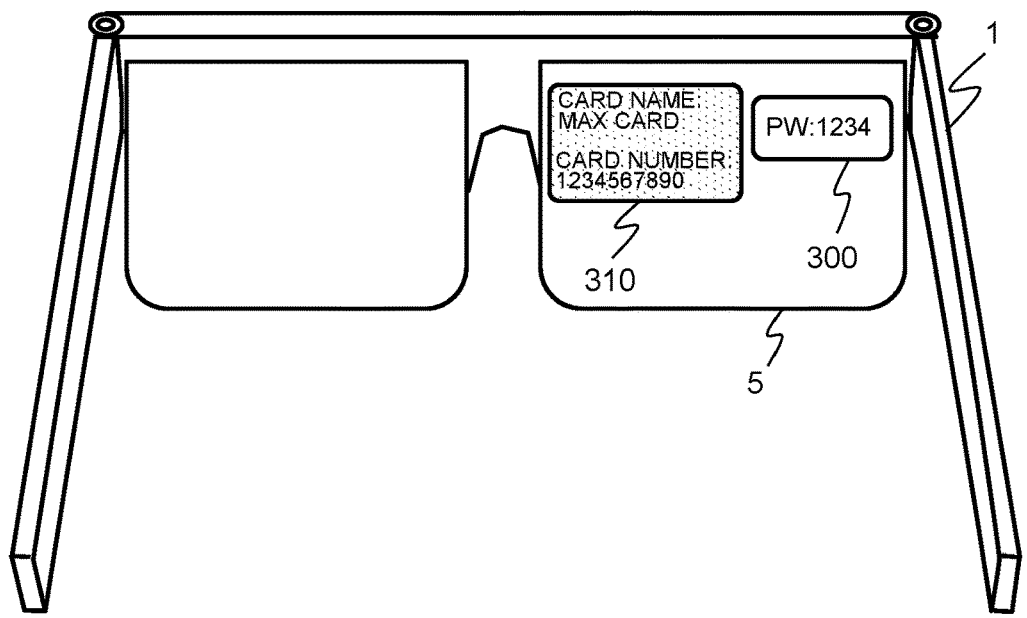
FIG. 4C is an image diagram in which a card image and a password captured by a camera at the time of registration are displayed on a display unit of the personal information display device in the embodiment.

FIG. 4C is an image diagram in which a card image 310 captured by the front capturing camera C2 and a password 300 input by the user are displayed on the display unit 5 (right eye in this example) of the personal information display device 1.

Figure 4D:
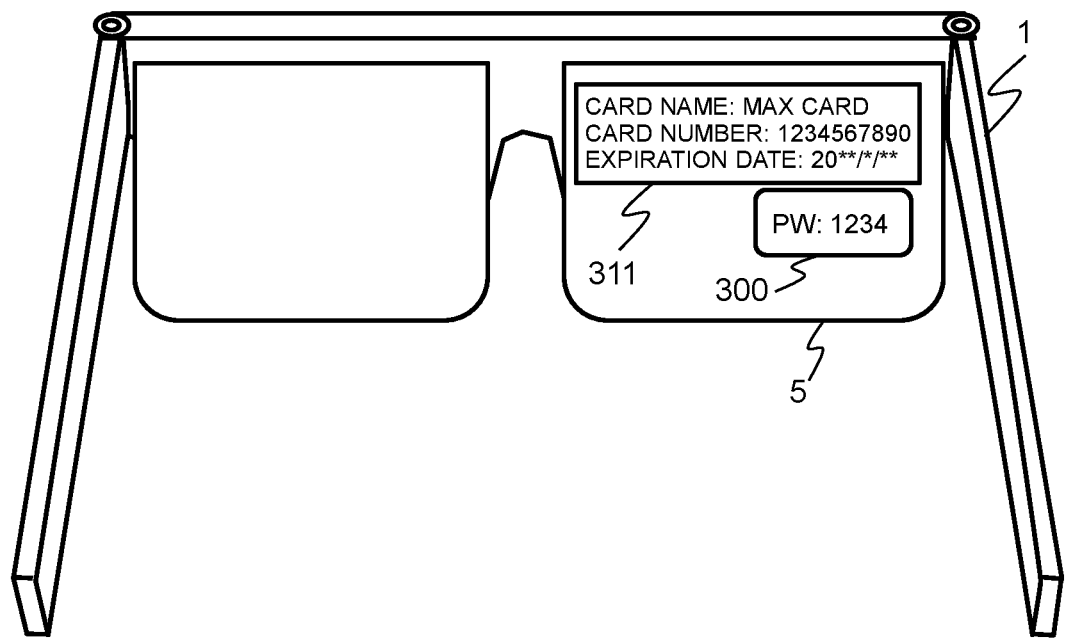
FIG. 4D is an image diagram in which character-recognized card information and a password at the time of registration are displayed on the display unit of the personal information display device in the embodiment.

FIG. 4D is an image diagram in which character-recognized card information 311 and the password 300 input by the user A are displayed on the display unit 5 of the personal information display device 1. That is, while the card image 310 is displayed in FIG. 4C, the character-recognized card information 311 may be displayed as shown in FIG. 4D.

Next, a method for inputting a password when the user A uses various cards will be shown. At this time as well, the user A wears the personal information display device 1 over his or her ears so as to wear the HMD as shown in FIG. 1. Since the checking of wearing is the same as that at the time of user registration described above, the description thereof will be omitted.

After checking that wearing is correct, iris recognition is started. In the iris authentication, the iris of the user A is captured by using the small camera C1, and the captured iris is compared with the iris information of the user A registered in advance. If it is determined that the captured iris matches the iris information, the registered individual's name may be displayed on the display unit 5, or may be transmitted by voice through the earphone 8. At this time, in order to prevent double unauthorized use, a keyword registered in advance may be said and checked. When capturing the iris, the user A may look at various places and accordingly, the iris capturing may not be successful. Therefore, an arrow, a mark, or the like may be displayed at an appropriate position on the display unit 5 so that the iris can be captured correctly, and "Please look at this arrow" may be displayed on the display unit so that the user A can see the arrow or mark, or an instruction by voice may be given through the earphone 8 so that the correct iris registration is performed.

Then, the work of checking the card information of a bank card or a credit card that the user A desires to use is performed. At this time, as shown in FIG. 4A, the user A himself or herself moves a card 31 so as to be able to be captured by the front capturing camera C2, and the front capturing camera C2 captures the card 31. At this time, the user A himself or herself adjusts the card 31 to a rough position or distance that can be recognized by the front capturing camera C2. If the card 31 can be recognized, the fact that the card 31 can be recognized may be displayed on the display unit 5. The captured screen may be displayed on the display unit 5 so that the user A can check the captured screen. Therefore, by using the determination result, for example, "Please move it a little further forward" or "Please move it a little further away" may be displayed on the display unit 5 for the user A. Alternatively, a voice may be transmitted by using the earphone 8, so that the card 31 is moved to a position where the information of the card 31 can be recognized as an image and is captured. Various kinds of information on the captured screen, for example, information such as the type of credit card, the card number, and the expiration date of the card is recognized by using the image recognition function 23.

Figure 4E:
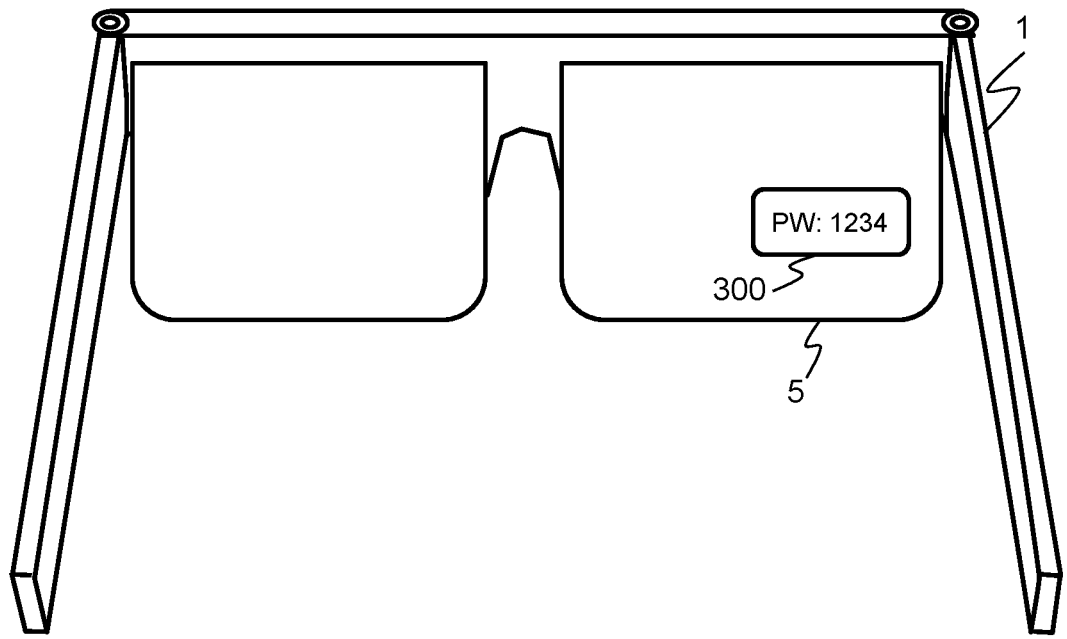
FIG. 4E is an image diagram in which a registered password when using a card is displayed on the display unit of the personal information display device in the embodiment.

Then, a password corresponding to the recognized card information is displayed. That is, a password of card information that matches the recognized card information is called from the information registered in advance, and the password is displayed on the display unit 5. FIG. 4E is an image diagram in which the password 300 already registered is displayed on the display unit 5 of the personal information display device 1 when a card is used. As shown in FIG. 4E, the credit card of the user A is captured by the front capturing camera C2, image matching is performed, and the image information of the card recognized to be the same among the pieces of card information registered in advance is displayed on the display unit 5.

In addition, in displaying the password, the user A may check whether or not the card to be used matches the recognized card. In this case, the card image is displayed on the display unit 5 of the personal information display device 1 and compared with the card actually held in the hand to check whether or not the cards match each other. As a checking method, a voice may be transmitted through the earphone 8. In addition, if the user feels that the checking operation is complicated, the operation may be omitted. If the cards match each other, for example, "OK" or "Match" is input by using the microphone 7, and is transmitted to the personal information display device 1. In the personal information display device 1, the voice from the microphone is input to the controller 10 and the voice is recognized by the voice recognition execution unit 12h, thereby determining whether or not the cards match each other. Alternatively, the user A may make a gesture with a finger or the like, for example, display an "OK" sign at a position where the front capturing camera C2 can take a picture with his or her finger. When matching is confirmed, the password of the card associated with the card is displayed on the display unit 5 as shown in FIG. 4E.

By performing such an operation, the user A can smoothly input the password even if the user A has forgotten the password. In addition, in the above, the password is displayed on the display unit 5, but the present invention is not limited thereto, and the password may be transmitted by voice through the earphone 8, for example.

As described above, in the present embodiment, the passwords of various cards are displayed on the display unit 5 when the various cards can be identified. As a result, the user can input the password according to the display. Therefore, since it is possible to display highly secure personal information, it is possible to provide a user-friendly personal information display device.

Next, an operation when the user A uses various application programs or uses a network by using, for example, a personal computer will be described.

Figure 5A:
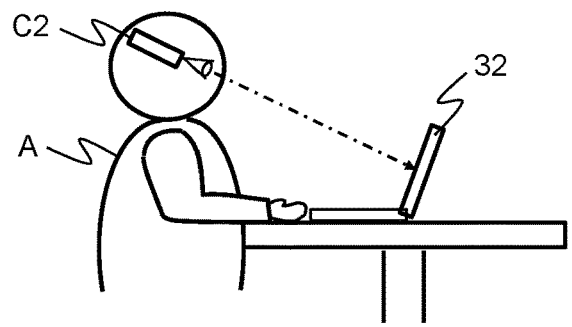
FIG. 5A is a diagram showing a user's working state when using a PC by using the personal information display device in the embodiment.
Figure 5B:
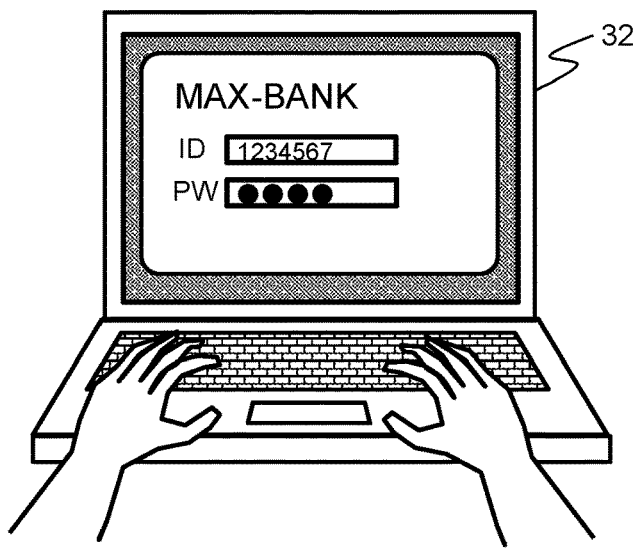
FIG. 5B is an image that a user sees when using a PC in the embodiment.

First, various kinds of service information, such as the use of various application programs and the use of a network, are registered. At this time, as shown in FIG. 5A, the user A is working in a state in which the front capturing camera C2 can capture the PC 32. FIG. 5B is an image that the user actually sees while working.

The image captured by the front capturing camera C2 is analyzed and recognized, and various kinds of information of the personal computer are displayed on the display unit 5. For example, as shown in FIG. 5B, the various kinds of information of the personal computer on the captured screen include types of various services and a screen prompting the input of an ID and a password that need to be input. The pieces of information are recognized by using the image recognition function 23, and each of the pieces of information is registered in the external memory 13. At this time, various kinds of registered information are encrypted and registered. The above information may be registered as information such as numbers or characters, or the personal computer screen itself may be captured and registered as an image. This is effective for determining whether or not the screen is a registered personal computer screen, as will be described later.

Then, information such as passwords or ID numbers required for various services is registered. This is input to the controller 10 by voice through the microphone 7 by the user, converted into digital data by the voice recognition execution unit 12h, and encrypted and recorded in the external memory in a state of being linked with the above-described information of various services. Alternatively, when the user uses the service information, the symbols or numbers input by the user A, for example, on the keyboard and the input order are captured by the front capturing camera C2, the image is recognized, and the input numbers or symbols are stored. At that time, in order to determine whether or not the input numbers or symbols are correct, the earphone 8 may be used to make the user A check whether or not the input numbers or symbols are correct. Alternatively, the numbers or symbols input to the display unit 5 may be displayed. The user A checks whether or not the numbers or symbols are correct. For example, if the numbers or symbols are correct, a voice such as "OK" may be input to the microphone 7. In addition, on the login screen, the password may be masked (for example, ●●●●) and not displayed as letters or numbers on the personal computer screen during registration and use. In particular, during the use, even if the password is input, only ●●●● or the like is displayed, so that it may not be possible to know whether or not the input is correct. Therefore, when registering the password, the input password is displayed by using the display unit 5. As this method, for example, when the user A performs a keyboard input, the order of the characters or numbers input by the user A is recognized by using the front capturing camera C2, and the characters or numbers are displayed in this order on the display unit 5.

Figure 5C:
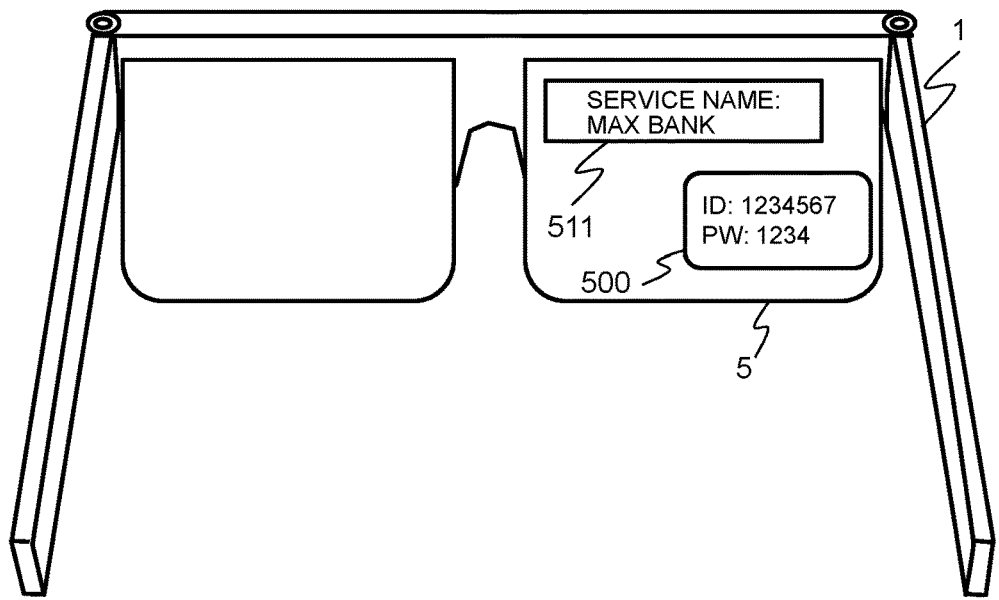
FIG. 5C is an image diagram in which a character-recognized service name, an ID, and a password at the time of registration are displayed on the display unit of the personal information display device in the embodiment.

FIG. 5C is an image diagram in which a character-recognized service name 511 and ID and password 500 input by the user are displayed on the display unit 5 of the personal information display device 1 at the time of registration.

Next, a method of inputting a password and an ID number when using various services will be described.

Figure 6A:
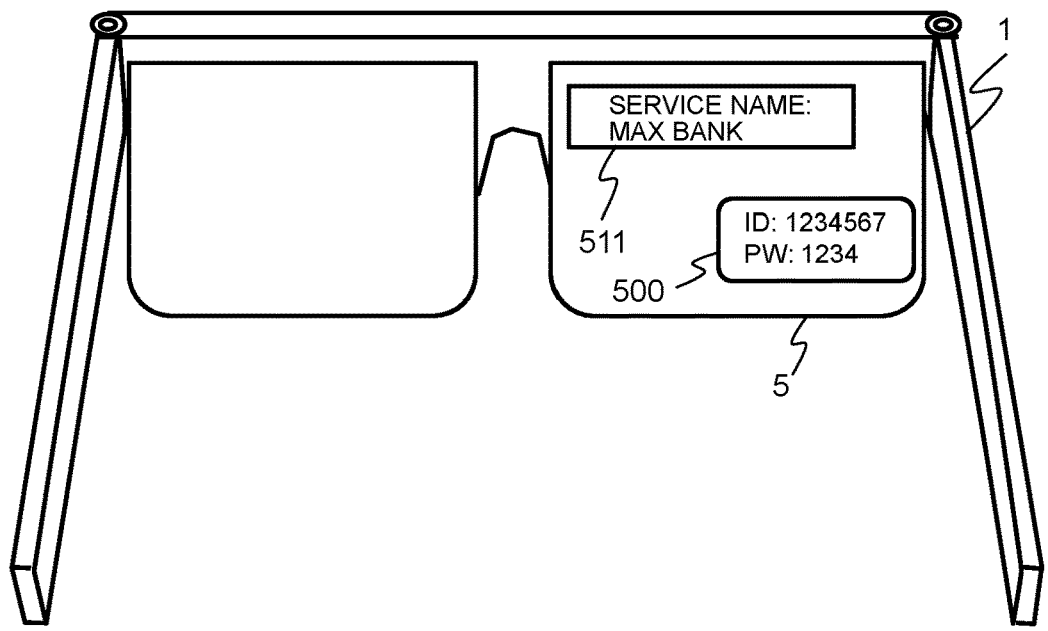
FIG. 6A is an image diagram in which a character-recognized service name, an ID, and a password when using a service are displayed on the display unit of the personal information display device in the embodiment.
Figure 6B:
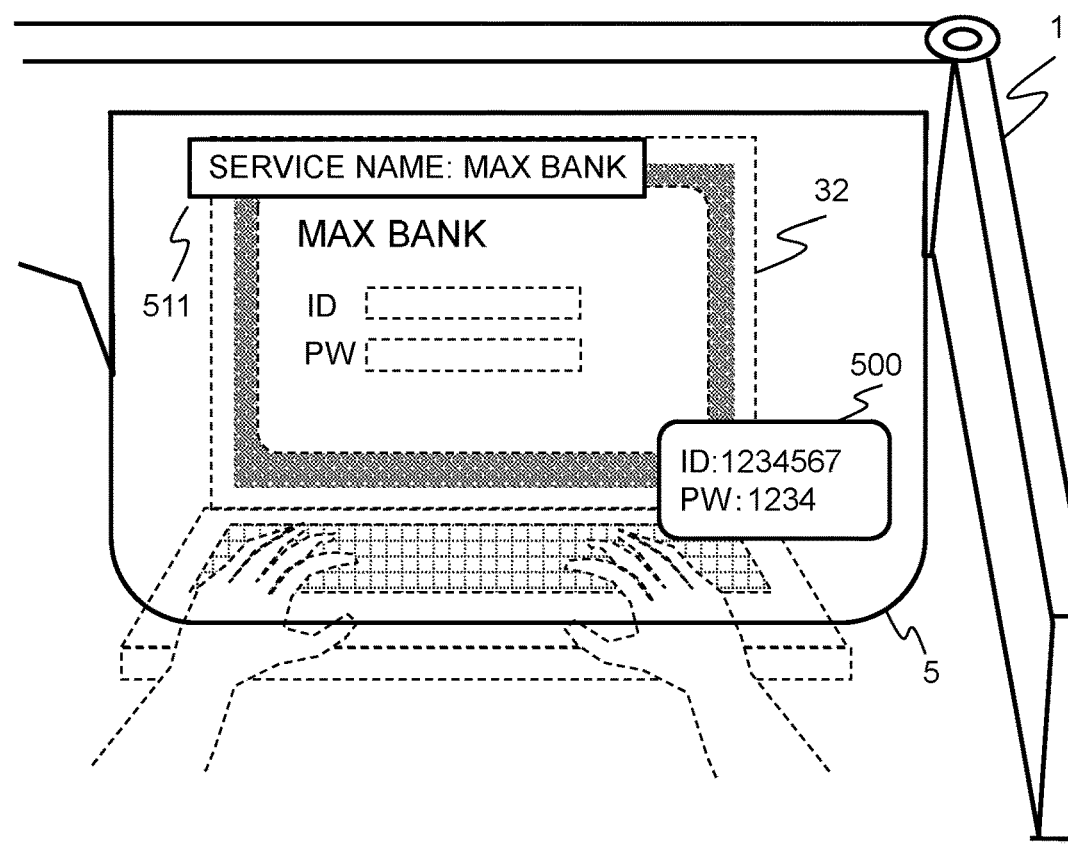
FIG. 6B is an enlarged view of the display unit in FIG. 6A.

FIG. 6A is an image diagram in which the character-recognized service name 511 and the already registered ID and password 500 are displayed on the display unit 5 of the personal information display device 1 when using various services. In addition, FIG. 6B is an enlarged view of the display unit 5 in FIG. 6A, and the PC 32 shown by the dotted line shows a state when directly viewed through the glasses.

When the user A uses a service by using the PC 32, the screen of the PC 32 is set so as to be able to be captured by the front capturing camera C2, the front capturing camera C2 captures the screen of the PC 32 viewed by the user A as in FIG. 5A, image matching is performed, and the service name 511 of the service recognized to be the same among the pieces of service information registered in advance is displayed on the display unit 5.

The user A compares the service name 511 displayed on the display unit 5 with the personal computer screen actually viewed. If these match each other, for example, "OK" or "Match" is input by using the microphone 7 and transmitted to the personal information display device 1. In the personal information display device 1, the voice from the microphone is input to the controller 10, the voice is recognized by the voice recognition execution unit 12h to check that determined to be correct by the user A, and then the ID or password 500 of the service associated with the service information or other pieces of information as needed are displayed on the display unit 5 as shown in FIG. 6B. After checking the ID and password 500, the user A inputs the ID and the password on the keyboard of the personal computer. At this time, when the information input by the user A is not displayed like a password (for example, ●●●●) as in FIG. 5B, the input information may be displayed at the bottom of the ID and password 500 in order to check the information input by the user A himself or herself.

In the above, the ID or the password is displayed on the display unit 5, but the present invention is not limited thereto, and the password may be transmitted by voice through the earphone 8, for example.

Figure 6C:
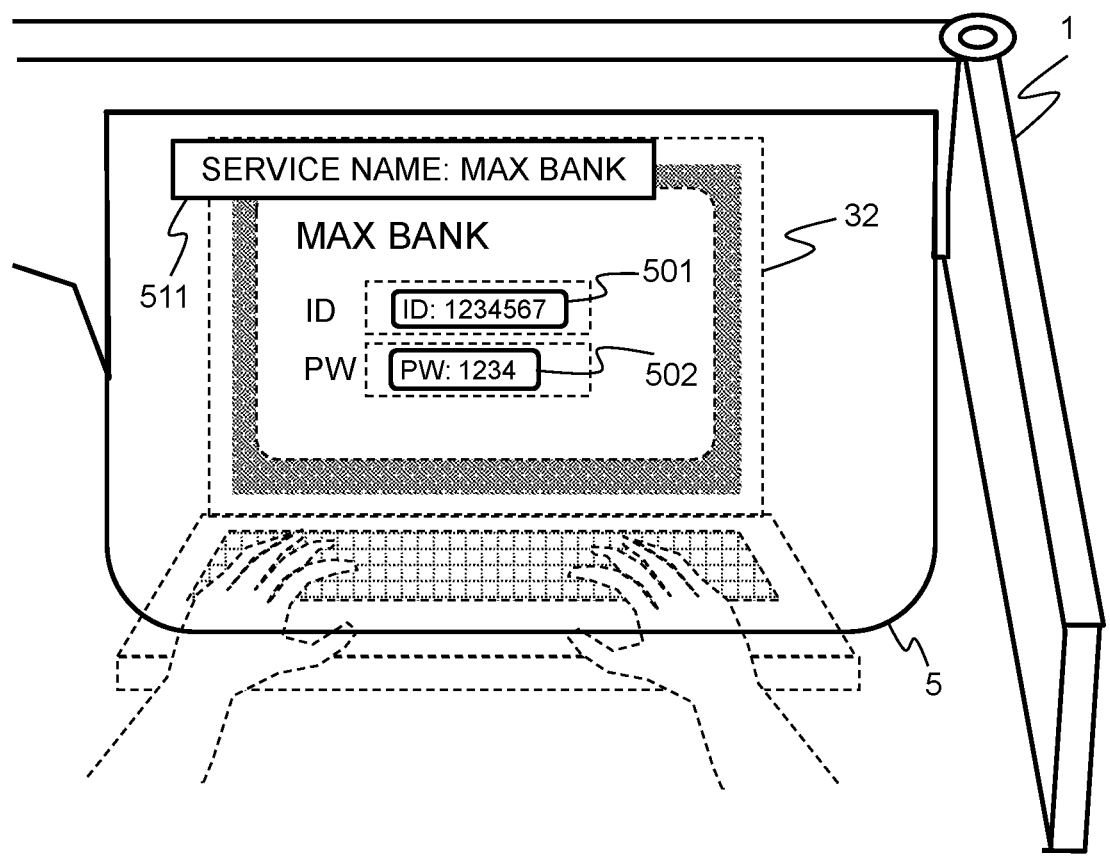
FIG. 6C is an image diagram in which a registered ID and password are displayed on the display unit of the personal information display device in the embodiment so as to be superimposed on an ID input field and a password input field on a PC viewed through glasses.

Alternatively, in order not to make a mistake relevant to the input location, the ID or the password may be displayed at the input position or near the input position to show the user A where and what information is to be input. For example, as shown in FIG. 6C, an already registered ID 501 may be superimposed and displayed in the ID input field on the PC 32 directly viewed through the glasses, and an already registered password 502 may be superimposed and displayed in the password input field on the PC 32 directly viewed through the glasses.

In addition, when the design of the login screen is changed, if the screen information registered in the personal information display device 1 does not match the screen with the new design, "no match" is undoubtedly displayed on the personal information display device 1. In this case, however, the user can explicitly input and specify the service. In addition, a system may be used that uses the AI function and supports a slight design change as long as the same company name and service name are used.

The above describes how to use the personal information display device 1 for various cards or various services using, for example, a personal computer. However, for example, when inputting a specific place such as a house or a company, it may be required to input an ID or a password in order to ensure security when opening and closing the door. Undoubtedly, in this case, a situation where there is a request for the input of an ID or a password may be captured and recognized by using the front capturing camera C2, and the corresponding ID or password may be displayed on the display unit 5 from the external memory 13. However, by registering a used place in advance as position information through the position sensor 6, it is possible to display the ID or password associated with the registered position information.

In addition, in the above embodiment, when the personal information display device 1 requests the user A to make a determination, the user A transmits the determination result by voice or keyboard input. However, the present invention is not limited thereto, and it is possible to make a determination by using the viewpoint tracking function and the display function. An example thereof will be described with reference to FIGS. 7A and 7B.

Figure 7A:
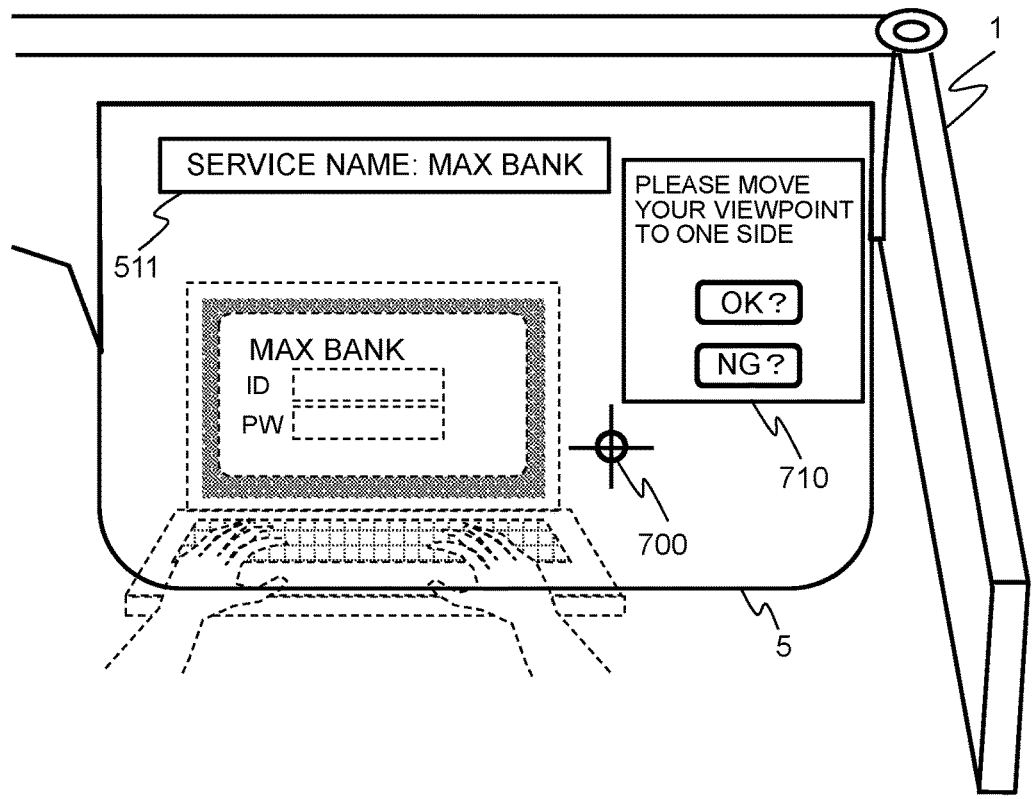
FIG. 7A is a display example of the display unit of the personal information display device when checking various kinds of service information when using a PC in the embodiment.
Figure 7B:
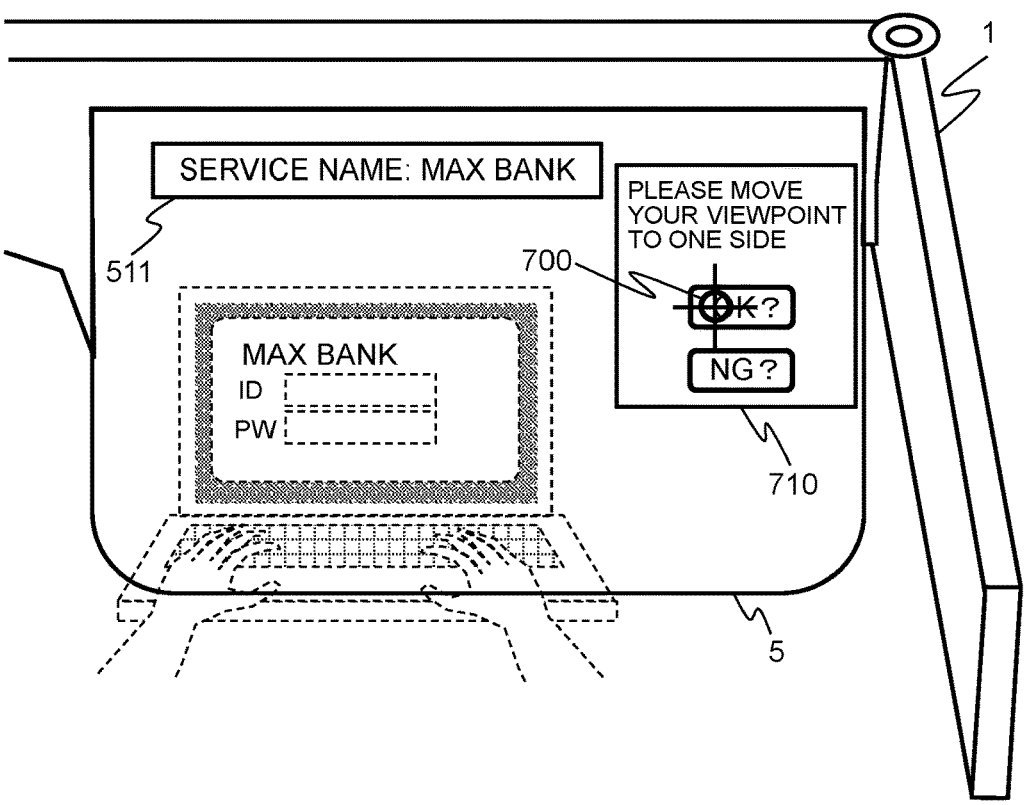
FIG. 7B is a display example when "OK" is selected from the viewpoint when checking various kinds of service information when using a PC in the embodiment.

FIG. 7A is a display example of the display unit 5 of the personal information display device 1 when the user A checks various kinds of service information, such as the use of various application programs and the use of a network, by using, for example, a personal computer, as in FIG. 5A. When the front capturing camera C2 is in focus, the personal information display device 1 calls information registered in the external memory 13, which matches the captured screen, and the user A checks the information. At this time, as shown in FIG. 7A, a viewpoint 700 of the user A and a checking window 710 are displayed on the display unit 5. The checking window 710 is a display field in which, for example, "OK?" and "NG?" are displayed in order to determine whether or not the information of various registered services and the screen viewed by the user A are the same and an instruction to move the viewpoint to the display position of "OK?" and "NG?" is given. As shown in FIG. 7B, when the user A determines, for example, "OK", the viewpoint is moved to the display position of "OK?", and the viewpoint is not moved, for example, until the personal information display device 1 determines "OK". For example, when the viewpoint position does not move for a predetermined period of time, the personal information display device 1 determines "OK" and displays the ID or password information associated with the user as shown in FIG. 5C. As a result, the user A can input an appropriate ID or password while checking without external input, such as voice or keyboard input. Needless to say, checking may be performed by a gesture or the like as described above.

Next, specific operations such as registering or displaying personal information, such as a password, will be described with reference to a process flow chart.

Figure 8:
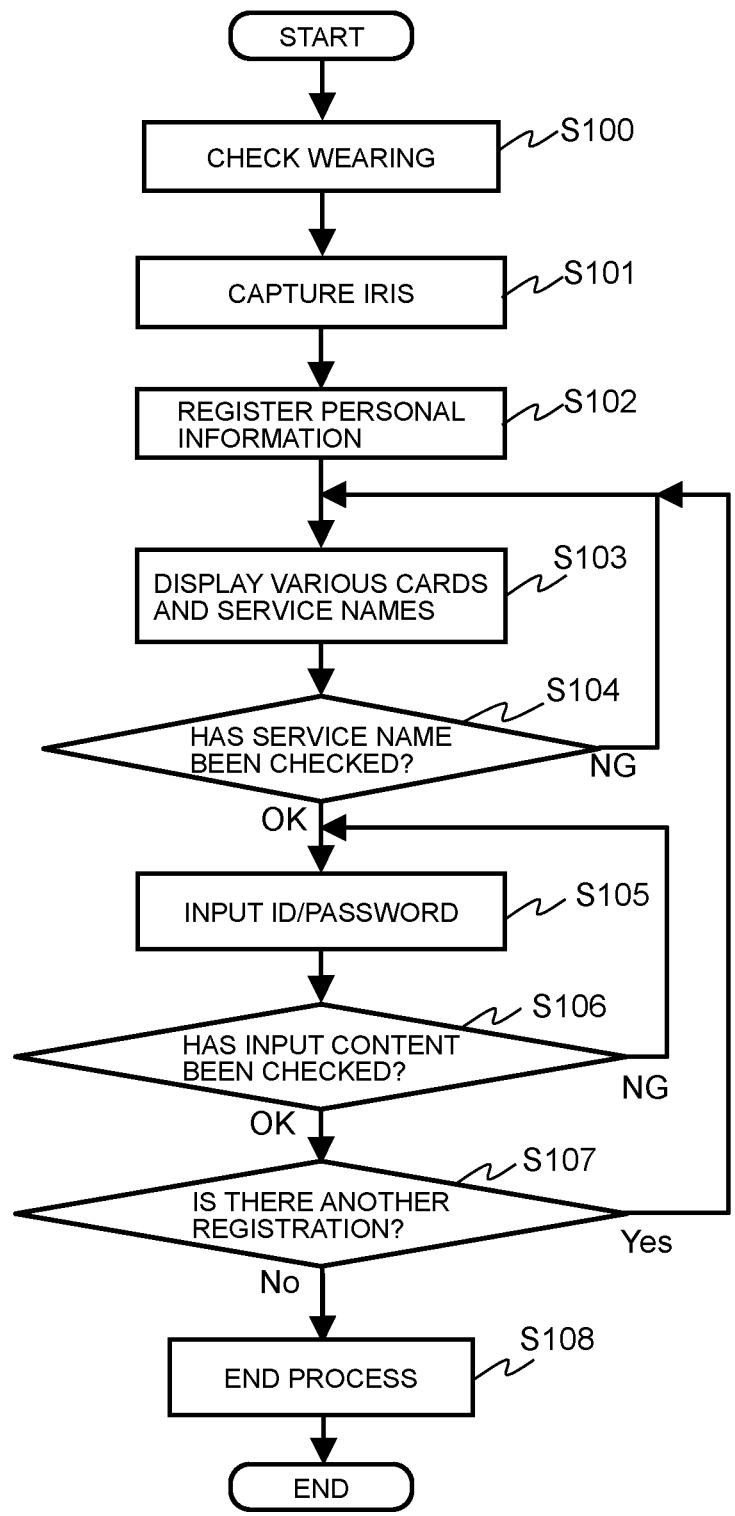
FIG. 8 is a processing sequence at the time of registration in the embodiment.

FIG. 8 is a process flow diagram at the time of registration in the personal information display device 1. In FIG. 8, first, as a premise, the user A turns on the power of the personal information display device 1 (not shown). At this time, the personal information display device 1 may be physically powered on by the user A with a switch or the like, or may be automatically switched on when the personal information display device 1 is worn. Power is supplied to each function along with the supply of power, and various programs are loaded. Then, in step S100, it is checked whether or not the user A has worn the personal information display device 1 at the correct position. Then, the iris of the user A is captured (S101). Thereafter, the personal information of the user A is registered (S102). The personal information and the iris information are linked, encrypted, and registered in the external memory 13. The personal information may be registered by voice input of the microphone 7 and the earphone 8, or may be displayed on the display unit 5 and input through the communication unit 14, for example, by a keyboard.

Thereafter, in order to register the information of various cards and services for which IDs or passwords are to be registered, first, the various card and service names are displayed (S103). For example, in the case of a bank card, the information of various cards and services is a bank name or a bank number, a branch name or a branch number, an account type and an account number, and the like. In the case of a credit card, the information of various cards and services is a credit company name, a credit number, an expiration date, a security code, and the like. Various services are the service name, the registered personal number, and the like.

Then, in step S104, the user checks the displayed service name and checks whether or not the service is a service to be registered. If NG, the process returns to S103. If OK, the information of various cards and services is registered. In step S105, in order to register an ID or a password required to use the card or the service, these are input. Then, in step S106, the input content is checked. If NG, the process returns to S105, and if OK, the ID and the password are registered. The registration of the various card and service information and the registration of the password or ID number associated with the registration are encrypted and stored in the external memory 13. Then, in step S107, if there is another card or service to be registered, the process returns to S103 to continue the same registration work. If there is no another card or service to be registered, the end process S108 is performed to end the process. In the end processing, in addition to the end processing of various programs or functions, for example, setting value registration by new learning in image recognition may be performed. In the above S107, when determining what the user A desires to do, the user A is directly asked through the display unit 5 or the earphone by using a display or a voice of "Is there another registration?". The user A responds to the question by voice or keyboard input through the microphone 7 or the communication unit 14.

Figure 9:
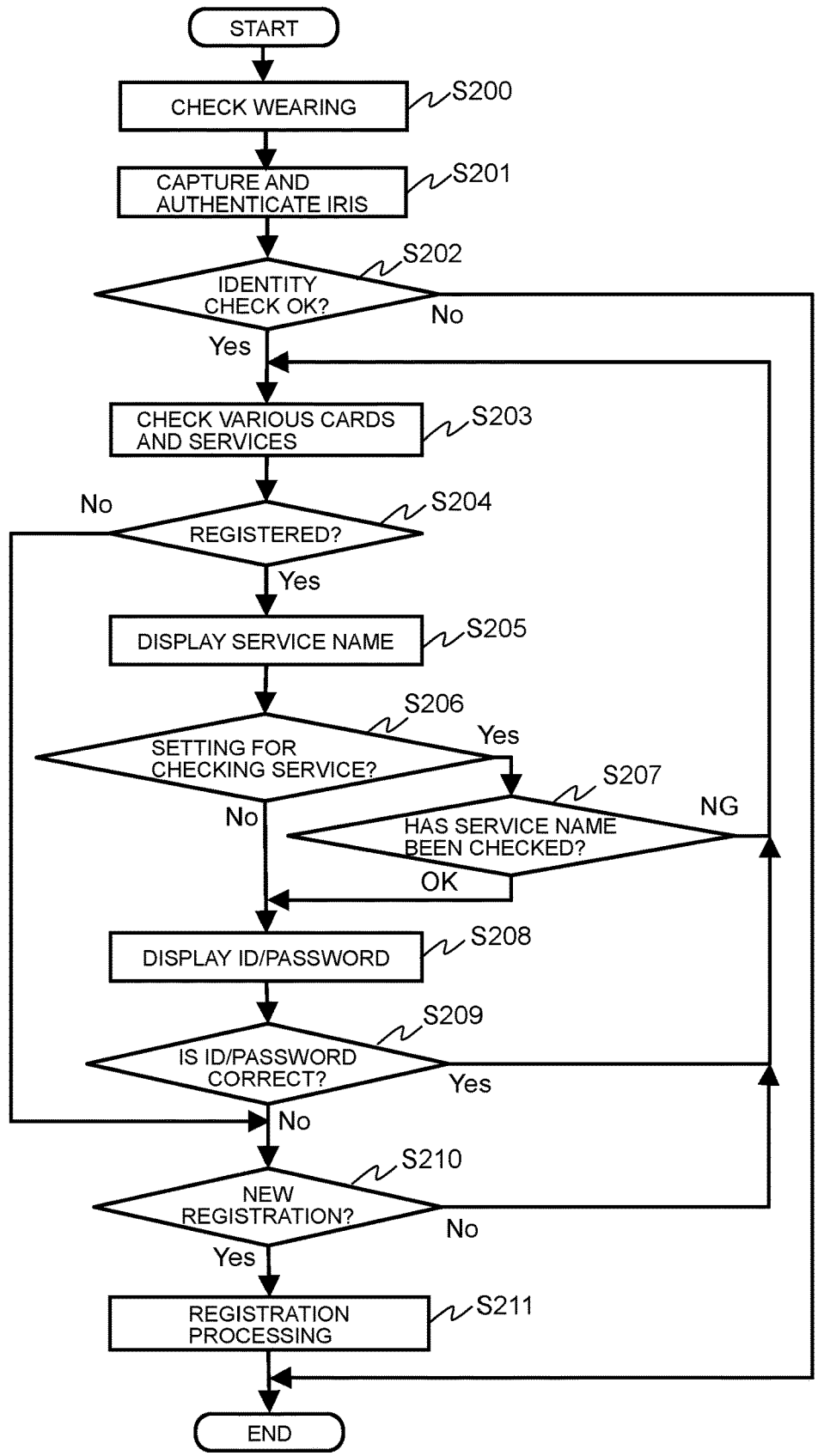
FIG. 9 is a processing sequence at the time of use in the embodiment.

FIG. 9 is a process flow diagram when it is desired to use various cards or services in the personal information display device 1. In FIG. 9, as in the process flow at the time of registration in FIG. 8, various programs are loaded by turning on the power of the personal information display device 1 as a premise. Then, it is checked whether or not the user A has worn the personal information display device 1 at the correct position (S200). Then, the iris is captured and authenticated with the registered iris of the user A that is encrypted and registered in the external memory 13 (S201). If the identity is confirmed in step S202, the process proceeds to the recognition of various cards and services (S203), and if the identity cannot be confirmed, the process ends.

In the recognition of various cards and services in S203, for example, in the case of various cards, the user A himself or herself moves the card to a position where the content of the card can be read by using the front capturing camera C2, and the card information is read by using recognition technology. Then, in step S204, it is determined whether or not the recognized information has been registered. If the recognized information is not registered, the process proceeds to step S210 in which the user determines whether or not to newly register the recognized information. When an instruction for new registration is given, registration processing is performed (S211) and the process ends. If no new registration is made, the process returns to the recognition waiting state of S203.

If the recognized information has already been registered in step S204, the process proceeds to step S205 to display the service name. Then, in step S206, it is determined how the setting for checking the service is made. In addition, this setting may be performed in advance by the user. If the setting for checking the service is not made, the ID/password is displayed in step S208, and it is determined whether or not the displayed ID/password is correct in S209. If the displayed ID/password is not correct, the process proceeds to step S210 for determination of new registration. If the displayed ID/password is correct, the process returns to the recognition waiting state of S203.

In step S206, in the case of setting for checking, the service name is checked in S207. In S207, the user A is notified by screen display or voice through the display unit 5 or the earphone 8 for checking. The user A responds by voice or keyboard input through the microphone 7 or the communication unit 14 as to whether or not the displayed ID/password is correct. After checking S207, passwords associated with the above-described various cards and services are displayed (S208). At this time, the passwords may be displayed on the display unit 5 or may be transmitted by voice through the earphone 8. In addition, although not described in the process flow, at this time, methods for the user A to input the password include a keyboard input to the PC, an input at the ATM in a bank or a convenience store, and an input on a credit card payment terminal in a store. To determine whether or not the input is correct, the input is captured by the front capturing camera C2 of the personal information display device 1, and whether or not the input is correct is determined by using image recognition technology. If the input is not correct, the user is notified with a buzzer through the earphone. Alternatively, whether or not the input is correct may be displayed on the display unit 5. As a result, the desired operation ends with the correct password. In addition, whether or not the desired operation has ended may be determined by image recognition technology after capturing by the front capturing camera C2, or the user A may be asked whether or not the desired operation has ended through the display unit 5 or the earphone 8 to make a determination.

In addition, in the above-described process flow of FIG. 8, the basic process flow is described for ease of explanation, but the present invention is not limited thereto. In the actual process flow, for example, in the checking of wearing in S100 or in the iris capturing in S101, if the wearing or iris capturing is not successful, checking at the time of wearing or iris capturing of the user A may be repeated by the number of retries set in advance, or if the wearing or iris capturing of the user A is not successful even thereafter, the fact may be displayed on the display unit 5 so that the user A himself or herself performs the wearing correctly. Or, for example, in iris capturing, in order to perform the iris capturing correctly, a display such as "Please look at the arrow part" may be displayed so that the user A can see the specific position of the display unit 5. Similarly, if the registration of various card and service names in S103 or the ID/password input in S105 is not successful, the number of retries may be set so that correct registration is performed. In this case, by using the display unit 5 in the same manner as described above, the fact that the registration has not been successful may be displayed to prompt the user A to perform the registration again. Similarly, in the case of the process flow of FIG. 9, an appropriate retry may be performed to perform correct use.

In addition, if the personal information display device 1 has a shape of an HMD, no one can see the personal information display device 1, and accordingly, the security is high. In addition, by using a means for checking the wearing state, the password may be displayed on the condition that the personal information display device 1 is worn, and the password display may be canceled after checking that the wearing of the personal information display device 1 has been removed. In addition, although the above shows an example in which the iris is registered only at the beginning, the present invention is not limited thereto, and the iris may be registered regularly. In addition, instead of performing the iris authentication only once, for example, when the user desires to know the passwords of various cards, the iris authentication may be performed each time. In addition, when the user A's operation takes time, the iris may be authenticated again to display the password.

In addition, although the above is personal authentication using an iris, for example, voiceprint authentication using a microphone may be used. In addition, information of the iris, various cards, or various services and passwords or ID information associated therewith may be automatically encrypted with a new encryption on a regular basis and stored in an external memory.

In addition, when registering an ID or a password in the above-described various kinds of card information or various kinds of service information, the user A may make the password management software recognize the card in advance by using, for example, keyboard input or the front capturing camera C2 of the personal information display device 1 so as to input the ID of the card, and input the password by voice or keyboard input so as to be recognized.

Undoubtedly, if such a device is released in the world, it will be recognized that personal information is recorded in the device. For this reason, it is also conceivable that the device will be stolen and the information in the external memory will be downloaded to acquire the information. Therefore, various passwords have a mechanism that can be unlocked only when iris authentication is performed, and the recorded data is recorded in an encrypted state. A key corresponding to the case of correct iris information may be issued, and a new key may be issued for each authentication and encrypted and recorded. In this manner, the encrypted information is not always the same key, so even if the information is stolen, the encrypted password corresponding to each service or card is always a different key. Therefore, the security becomes higher.

Alternatively, a mechanism is installed so that the information inside can be deleted when the user confirms that the information has been stolen. This is done by the communication means in FIG. 2. The information inside is easily deleted from the mobile phone by using the registration number and password of the personal information display device 1 in advance.

Alternatively, by using the position sensor 6 using a GPS, it is also possible to use a GPS function to check where the stolen information is and delete the stolen information. By using the above function, it is possible to know when and where the stolen information was used. In addition, it is also possible to check the content of various cards or various services used by wearing, power input, or the operation of the front capturing camera C2.

In future services, there is also a method of renting this out to users and receiving a service fee based on the number of times this is used.

As described above, in the present embodiment, a front capturing camera and a small camera for performing iris capturing or viewpoint tracking of the user are mounted in the personal information display device, and a cash card or a credit card held by the user is captured by the front capturing camera and the type or number of the target card are identified by image recognition technology. Alternatively, a password input screen of a PC/tablet/smartphone or the like is captured by the front capturing camera, and then the service to be input is identified by image recognition technology for the captured image. After the identification, the login ID or password registered in association with the card information or various services from the controller or the memory in the HMD is displayed in the user's field of view by the display unit of the HMD. By performing personal authentication with biometric information such as the iris, the password is not displayed even if another person wears the personal information display device. Therefore, the security is maintained. Then, since the login ID or the password is displayed in the field of view just by going to the password input screen, there is no mistake in the password and the security is sufficiently guaranteed.

In addition, when registering a new password or changing the password regularly, new password registration or regular password change is recognized by the character recognition technology of the front capturing camera similarly, the characters input by the user in the password input area are recognized, and the password in the HMD is automatically newly registered or changed. Alternatively, a command indicating new password registration or regular password change is given to the HMD through voice, gesture, or menu. Alternatively, the viewpoint tracking may be used to allow the user to select an instruction displayed on the display unit of the HMD from the viewpoint. When no command is used, the user may check the registration or change from the HMD.

In addition, in a service in which the input characters are not displayed when the user inputs a password according to the display on the display unit of the personal information display device, all the input characters recognized as input by the user are displayed on the display unit of the HMD. As a result, the input content can be checked, and input errors can be prevented in services that require double input.

In addition, in order to determine what the user is looking at, the viewpoint is detected by a small camera, a target such as a card that the user A is looking at is determined from the positional relationship between the viewpoint and the image captured by the front capturing camera, and the card type and ID number are identified by the image analysis. For example, information such as a bank name and an account number is recognized in the case of a bank cash card, and information such as a credit company name, a credit card number, an expiration date, and a personal name is recognized in the case of a credit card, and the password associated with the information is displayed on the display unit in the HMD. At this time, needless to say, iris authentication is performed to check whether or not the user A is wearing the HMD and the password is displayed after confirming the user A.

While the embodiments of the present invention have been described above, the present invention is not limited to the embodiments described above, and includes various modification examples. For example, in the above embodiments, the components have been described in detail for easy understanding of the present invention. However, the present invention is not necessarily limited to having all the components described above. In addition, some of the components in one embodiment can be replaced with the components in another embodiment, and the components in another embodiment can be added to the components in one embodiment. In addition, for some of the components in each embodiment, addition, removal, and replacement of other components are possible. In addition, each of the above-described components, functions, and processing units may be realized by hardware, for example, by designing some or all of these with an integrated circuit or the like.

REFERENCE SIGNS LIST

A User
1 Personal information display device
2 Camera unit
5 Display unit
6 Position sensor
7 Microphone
8 Earphone
9 Wearing sensor
10 Controller
11 ROM
12 RAM
13 External memory
14 Communication unit
21 Capturing processing unit
22 Iris/viewpoint detection and recognition function
23 Image recognition function
24 Memory
31 Card
32 PC
C1 Small camera
C2 Front capturing camera

The invention claimed is:

1. A personal information display device having a glasses-shaped display, comprising:
    a first camera that captures an individual's iris;
    a second camera that captures external information; and
    an information input interface that inputs an ID or a password;
    a display that displays a screen which displays the ID or the password; and
    a controller,
    wherein the first camera is configured to capture the iris of an individual wearing the personal information display device,
    wherein the second camera is configured to capture information of various cards or various services,
    wherein the controller is configured to:
    acquire iris information from the captured iris,
    acquire recognition information of the various cards or the various services from the captured information of the various cards or the various services,
    register personal information from the iris information,
    register the input ID or the password in association with the recognition information of the various cards or the various services,
    compare the iris information with an iris registered in advance,
    cause the screen on the display to display the ID or the password, only when the iris information and the iris registered in advance match and an instruction to display the recognition information has been received,
    wherein the ID or the password is associated with the various cards or the various services, and the information of the various cards or the various services captured by the second camera matches recognition information of the various cards or the various services registered in advance.

2. The personal information display device according to claim 1,
    wherein the second camera captures an ID or a password for registration an individual inputs on a screen, and wherein the information input interface recognizes characters or numbers input from the captured screen.

3. The personal information display device according to claim 1,
wherein, when registering an ID or a password associated with the recognition information of the various cards or the various services by inputting the ID or the password with the information input interface, the controller displays the recognition information of the various cards or the various services on the display so that a user determines whether the information displayed on the display unit is correct, and when the information displayed on the display unit is correct, registers the ID or the password by inputting the ID or the password with the information input interface.

4. The personal information display device according to claim 3,
wherein the controller determines whether the information displayed on the display is correct based on a voice of the user.

5. The personal information display device according to claim 3,
wherein the controller determines whether or not the information displayed on the display is correct based on a gesture of the user.

6. The personal information display device according to claim 3,
wherein the first camera tracks a viewpoint of the user, and
wherein the controller displays the viewpoint on the display, and determines whether the information displayed on the display is correct based on a movement of the viewpoint of the user.

7. A processing method of a personal information display device having a glasses-shaped display, comprising:
capturing an iris of an individual wearing the personal information display device and acquiring iris information from the captured iris;
inputting an ID or a password;
displaying, on a display, a screen which displays the ID or the password;
capturing information of various cards or various services;
acquiring recognition information of the various cards or the various services from the captured information of the various cards or the various services;
registering personal information from the iris information and registering the ID or the password in association with the recognition information of the various cards or the various services; and
comparing the iris information with an iris registered in advance and; and
causing the screen on the display to display the ID or the password, only when the iris information and the iris registered in advance match and an instruction to display the recognition information has been received,
wherein the ID or the password is associated with the various cards or the various services, and the information of the various cards or the various services captured by the second camera matches recognition information of the various cards or the various services registered in advance.

8. The processing method of a personal information display device according to claim 7, further comprising:
capturing on a screen an ID or a password for registration input by an individual; and
recognizing input characters or numbers captured on the screen.

9. The processing method of a personal information display device according to claim 7,
wherein, when registering an ID or a password associated with the recognition information of the various cards or the various services, the recognition information of the various cards or the various services is displayed so that a user determines whether the displayed information is correct, and when the displayed information is correct, the ID or the password is input and registered.

10. The processing method of a personal information display device according to claim 9,
wherein whether the displayed information is correct is determined based on a voice of the user.

11. The processing method of a personal information display device according to claim 9,
wherein whether the displayed information is correct is determined based on a gesture of the user.

12. The processing method of a personal information display device according to claim 9, further including
tracking a viewpoint of the user with a camera, and displaying the viewpoint, and
determining whether the displayed information is correct based on a movement of the viewpoint of the user.

* * * * *